Figure 1:
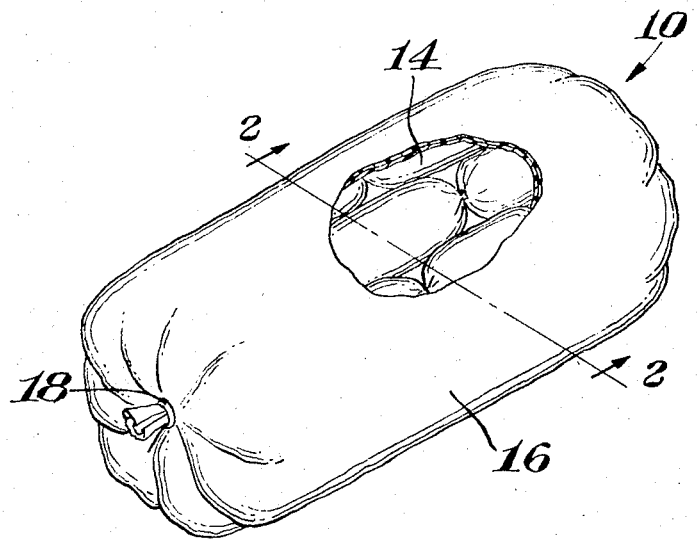
Figure 2:
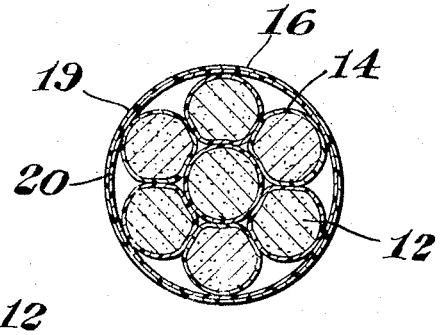
Figure 3:
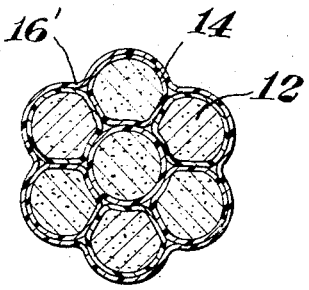

T861046

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1021

742,410

MASTER SHIPPING AND STORAGE CONTAINER FOR PREPACKED MEAT PRODUCTS

Oliver R. Titchenal, 396 Crossbrook, Berea, Ohio 44017, James J. Bader, 2312 Belaire, Midland, Mich. 48640, and Wallis I. Hoyle, 849 Hemlock St., Sleepy Hollow, Dundee, Ill. 60118

Filed July 3, 1968. Published Apr. 22, 1969

Class 99—174

1 Sheet Drawing. 10 Pages Specification

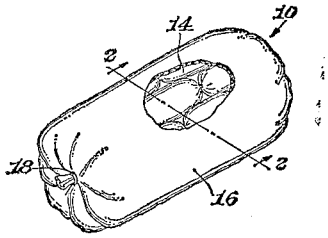

Individual quantities of fresh meat are separately prepackaged in breathable films in the form, for example, of chub packs or film overwrapped trays or plastic film coatings. A plurality of such packs are then inserted in a gas-tight shipping and storage container formed of a film which is substantially impermeable to oxygen penetration over extended periods of time, i.e., for several days. When it is desired to finally display a prepackaged meat for sale to the ultimate consumer, the individual packs are removed from the shipping and storage container, and the breathable film forming the skin of such packs is exposed to the atmosphere. Air penetrating through the breathable film blooms the meat to a desirable and saleable bright red color. The use of the shipping and storage container thus permits the shelf life of the meat product to be considerably extended.

T861046

April 22, 1969

O. R. TITCHENAL ET AL
MASTER SHIPPING AND STORAGE CONTAINER
FOR PREPACKED MEAT PRODUCTS
Filed July 3, 1968

DEF. PUB.
SN - 742410

T861046

INVENTORS.
Oliver R. Titchenal
James J. Bader
Wallis I. Hoyle
BY Lloyd E. Hessenauer Jr.
ATTORNEY